United States Patent Office.

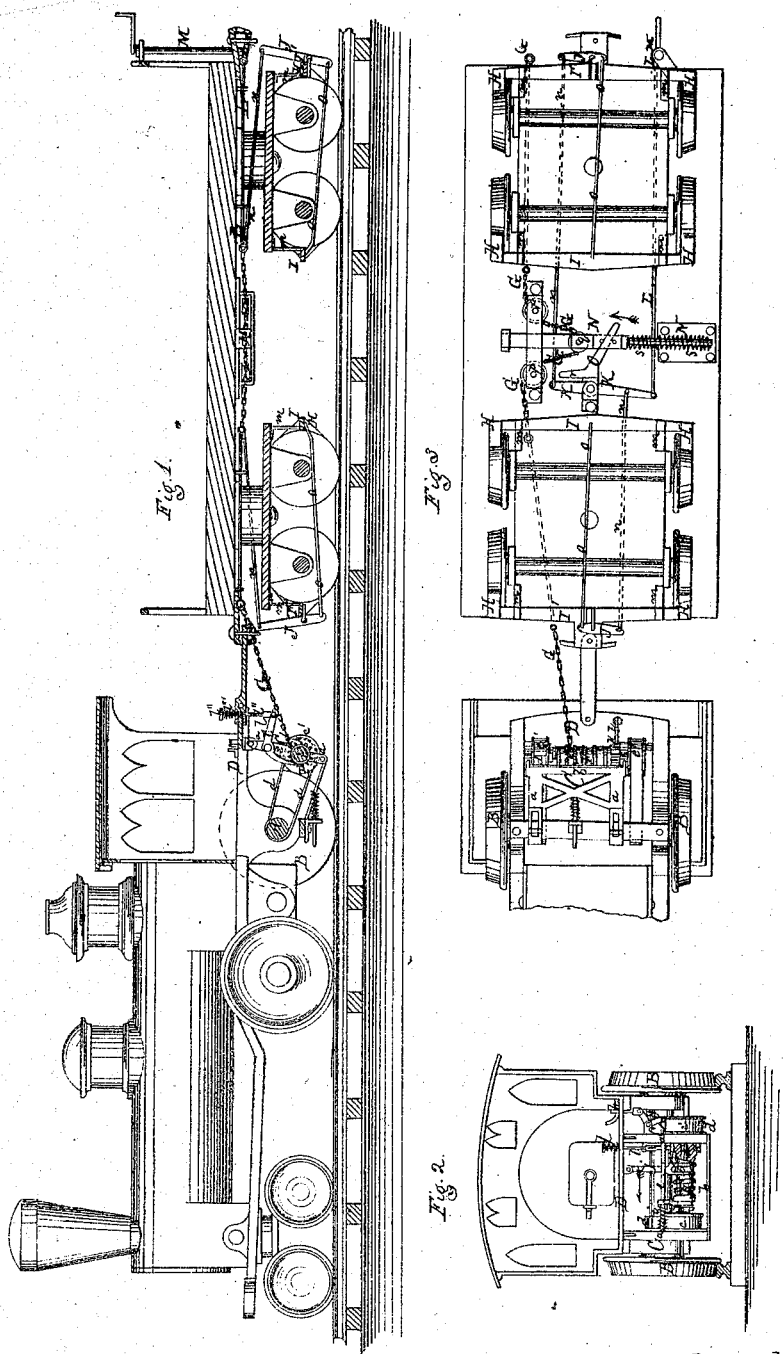

JAMES WHITE AND THOMAS LINGLE, OF SOUTH AMBOY, NEW JERSEY.

Letters Patent No. 75,501, dated March 10, 1868.

IMPROVED CAR-BRAKE.

*The Schedule referred to in these Letters Patent and making part of the same.*

TO ALL WHOM IT MAY CONCERN:

Be it known that we, JAMES WHITE and THOMAS LINGLE, of South Amboy, in the county of Middlesex, and State of New Jersey, have invented a new and improved Railroad-Car Brake; and we do hereby declare that the following is a full, clear, and exact description thereof, which will enable those skilled in the art to make and use the same, reference being had to the accompanying drawings, forming part of this specification, in which—

Figure 1 represents a side elevation, partly in section, of our invention.

Figure 2 is a rear end elevation, partly in section, of a locomotive having our improved apparatus for operating the brake.

Figure 3 is an inverted plan view of our invention.

Similar letters of reference indicate corresponding parts.

This invention relates to a new device for operating car-brakes from the locomotive, said device being so arranged that the brakes of a whole train of cars can be applied to the wheels of the cars from the locomotive whenever desired, and be applied with any desired degree of force, and be all released or applied simultaneously by the engineer.

The invention consists, first, in arranging a frame, in the lower end of which a horizontal shaft is hung for winding up the brake-chain, and in suspending this frame near the rear end of the locomotive, and in connecting the said shaft with the axle of the rear wheels of the locomotive by a belt, all the parts being so arranged that the weight of the suspended frame will always keep the belt stretched.

The invention consists, second, in providing a sliding clutch on the aforesaid shaft, which is connected with a sleeve turning loose on the shaft, the brake-chain being attached to the said sleeve. The sleeve turns loose on the shaft until it is, by the engineer, thrown against the clutch on the shaft, which is done by means of a lever reaching up through the platform of the locomotive. The sleeve will then be revolved with the shaft, and the chain be wound up.

The invention consists, thirdly, in the application of a gauge, whereby the winding up of the chain is stopped as soon as the brakes are fully applied, and whereby the sleeve will be thrown out of gear if further winding up of the chain is attempted.

The invention consists, fourthly, in the use of a device for preventing the chain from being unwound, even if the sleeve is not more in gear with the shaft, and in an arrangement for setting the sleeve free whenever desired, so that the brakes may be released.

The invention consists, finally, in such an arrangement and construction of the devices on the cars for operating the brakes that, by a continuous chain or link, all the brakes may be simultaneously operated from the locomotive, the parts being so arranged that a hand-brake can be applied on each car, whereby the brakes on each car can be operated separately from those on the other cars of a train by a person standing on the platform of the said car, so that our improvement can be applied on all cars now in use, without interfering with the mechanism and operation of other contrivances that may already be arranged on such cars.

A represents the rear revolving axle on a locomotive, connecting the wheels B in the ordinary manner. C is a frame, consisting of two upright bars, $a\ a$, the lower ends of which are connected by a horizontal bar, $b$, while their upper ends are hinged to the under side of the platform D of the locomotive, near to the rear end of the same, as shown. E is a horizontal shaft, having its bearings in the uprights $a$ of the frame C, so as to turn freely in the same. Two pulleys, $c\ c'$, are mounted on the ends of the shaft E. $d\ d$ are two belts, which are laid over the pulleys $c\ c'$, and over the axle A, so as to impart motion from the latter to the shaft E.

The frame C is hung so that its lower end will incline forward, or rather the belts $d\ d$ are made so short that the frame will hang in this position, the object of which is to make the weight of the frame C and its appendages continually tend to bring it into a vertical position, thereby keeping the belts $d$ right at all times.

F is a sleeve, which is fitted around the shaft E, so as to turn and slide loosely on the same. At one end of this sleeve is a clutch, which can be fitted into a clutch formed on the pulleys, whereby the sleeve can be made to revolve with the shaft E.

$e$ is a sliding bar arranged above the shaft in the frame C. It has a downward-projecting pin, $f$, which fits into a groove that is provided in the clutch on the sleeve F. One end of the bar e is hinged to a bell-crank, g, which is pivoted to the outside of one of the arms a, and to which the lower end of a vertical rod, h, which passes up through the platform of the locomotive, is pivoted. A spring, i, which is fitted on the rod e, has the tendency to push the said rod towards the bell-crank, thereby disengaging the clutches. By pressing upon the upper end of the rod h, the bar e will be moved in the direction of the arrow in fig. 2, thereby moving, by means of the pin f, the sleeve F towards the pulley c, whereby the sleeve will be thrown into gear with the shaft E. The front end of the brake-chain G is attached to the sleeve F, near that end of it on which the clutch is arranged.

A groove for receiving the chain may be arranged in the line of a screw-thread around the sleeve, so that the chain will be wound evenly. As soon as the rod h is depressed the sleeve will be thrown into gear with the shaft E, and will be revolved, so as to wind the chain G around it. As long as the lever is thus depressed, the sleeve will continue to revolve.

To prevent the tearing of the chain, which would be the case if the revolution of the sleeve is not stopped as soon as the brakes are applied, we have arranged an adjustable gauge, j, which is a bar hinged to the under side of the platform D, and fitted through a staple on the rod e, and then bent so as to partly enclose the sleeve F. As soon as the chain is wound up so far on the sleeve that it strikes against the lower end of the rod j, it will move the rod e towards the bell-crank, and will thereby disengage the sleeve from the shaft E, and elevate the rod h. The staple on the bar e, which surrounds the gauge j, can be adjusted on the bar e, by means of set-screws or otherwise, so that the position of the gauge may be regulated in accordance with the width of the brake-shoes, the gauge being gradually moved towards the bell-crank as the shoes are becoming worn.

When the chain is wound around the sleeve, the latter has to be disengaged from the shaft E, and would certainly turn and unwind the chain, as soon as it is thus disengaged from the shaft E, if some arrangement for preventing it from turning had not been provided. This arrangement consists in the use of a toothed or ratchet-wheel, k, which is mounted on one end of the sleeve F, and in the use of a self-acting spring-pawl, l, which catches into the teeth of the ratchet-wheel as soon as the sleeve is disengaged from the shaft E, or, in other words, as soon as the sleeve has been moved on the shaft E, so that the ratchet-wheel will come under the pawl. The pawl l consists of an elbow-lever, l', which is pivoted to one of the arms a, as shown, by a pin passing through the junction of its two ends. The lower end of the vertical arm of the lever l' fits into the teeth of the ratchet-wheel, while to the end of the horizontal arm is pivoted the lower end of a vertical rod, l'', which passes up through the platform D, and which is provided with a spring, l''', as shown. This spring tends to raise the bar l'', thereby throwing the end of the bar l' into the teeth of the ratchet-wheel, thereby preventing the sleeve F from revolving. When the rod l'' is pressed down, the pawl will be disengaged from the ratchet-wheel, and the sleeve will be free to revolve, thereby allowing the brake-chain to be unwound from the sleeve.

H H are the brake-shoes, which are mounted on cross-bars, I and I', that are connected, by means of springs, m m, to the under side of the cars. On the outer bars I' are hinged upright levers J, the upper ends of which are connected with rods n, while their lower ends are connected, by rods o, with the opposite inner cross-bars I. The rods or chains n are secured to the ends of a bar, K, which is pivoted to the under side of the car, as shown. L is the chain which extends from one end of the bar K to the upright shaft M, by which the brakes are operated in the ordinary manner, from the platform of the car, (by turning the said shaft M.)

The brake-chain G, which is to operate the brakes from the locomotive, passes around three rollers, p, p, and q, of which the latter is attached to a sliding rod, N, which is fitted to the under side of the car, while the rollers p p are stationary, fitted to the under side of the car, as seen in fig. 3. The chain passes first over one roller, p, then over q, and then over the other roller, p, and thus, when the chain is stretched, by being wound upon the sleeve F, it has the tendency to move the roller q towards the rollers p, thereby sliding the bar K in the direction of the arrow in fig. 3.

The bar N is connected with a lever, O, which is pivoted to the under side of the car, and which has an arm, r, which, when the bar N is moved, as described, will press against the bar K, and move or turn the same in the same manner as the same is moved when the chain L is pulled. The bar N is connected with a spiral or other spring, s, by which it is brought into the original position, (that is, the brakes released,) as soon as the chain G is slackened. If the hand-brake M is used, it will not interfere with those portions which are connected with the chain G, and will, therefore, have no effect on other cars. The chain G, which need not be a complete chain, as it can be partly composed of rods, can be fitted under a number of cars, and will operate ten and twenty cars as well as one.

We claim as new, and desire to secure by Letters Patent—

1. The suspended frame C, in combination with the shaft E, axle A, and band d, and the devices for preserving the tension of the band, substantially as described, for the purpose specified.

2. The sliding clutch and sleeve F, with brake-chain G attached, substantially as described, for the purpose specified.

3. In combination with the sliding clutch, the rod e, pin f, bell-crank g, and rod h, substantially as described, for the purpose specified.

4. The self-acting gauge, when the same is arranged for the purposes set forth, and when consisting of the adjustable bar j, arranged as described, in combination with the bar e, bell-crank g, (or its equivalent,) and rod h, all made and operating substantially as and for the purpose herein shown and described.

5. The adjustable gauge j, in combination with grooved sleeve F and rod e, substantially as described, for the purpose specified.

6. The device for operating the brakes by the chain G, said device consisting of the arrangement and combination, with the lever K, of the lever O, (having an arm, $r$,) the sliding bar N, spring $s$, and pulleys $p, p$, all made and operating substantially as and for the purpose herein shown and described.

7. The lever K, in combination with the lever O and chain L, for the purpose of combining the hand-brake with that which is operated from the locomotive, substantially as set forth.

8. The ratchet-wheel $k$ and spring-pawl $l$, in combination with the sleeve F, all constructed as described, for the purpose specified.

JAMES WHITE,
THOMAS LINGLE.

Witnesses:
J. W. FORMAN,
JOHN MUIRHEID.